Sept. 13, 1949.　　　　　L. S. WILLIAMS　　　　　2,482,047
TEMPERATURE CONTROL FOR WEIGHING SCALES
Filed Oct. 31, 1944　　　　　　　　　　　　　　3 Sheets-Sheet 1
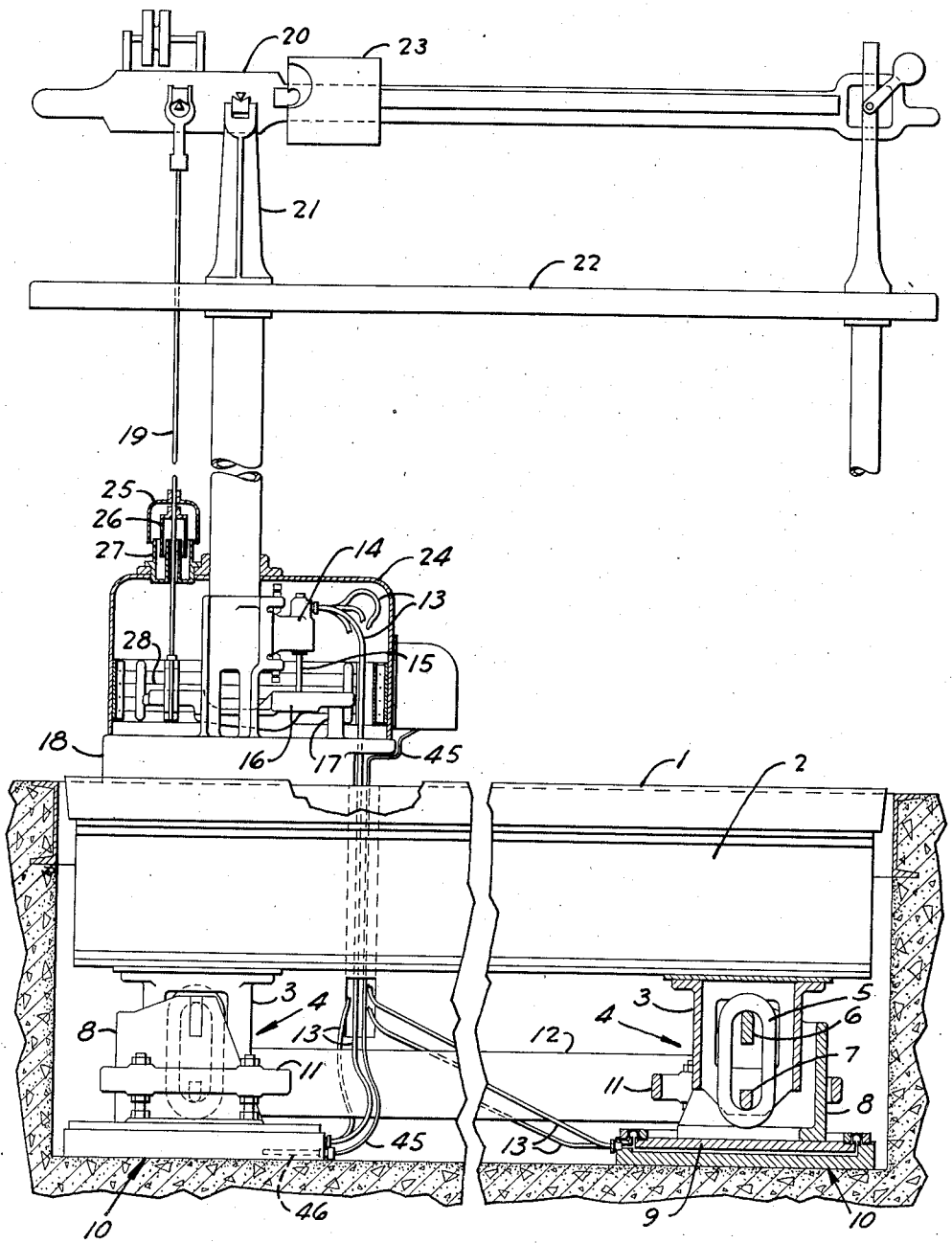
Fig. I
INVENTOR.
Lawrence S. Williams
BY
Marshall & Marshall
ATTORNEYS Sept. 13, 1949.  L. S. WILLIAMS  2,482,047
TEMPERATURE CONTROL FOR WEIGHING SCALES
Filed Oct. 31, 1944  3 Sheets-Sheet 2
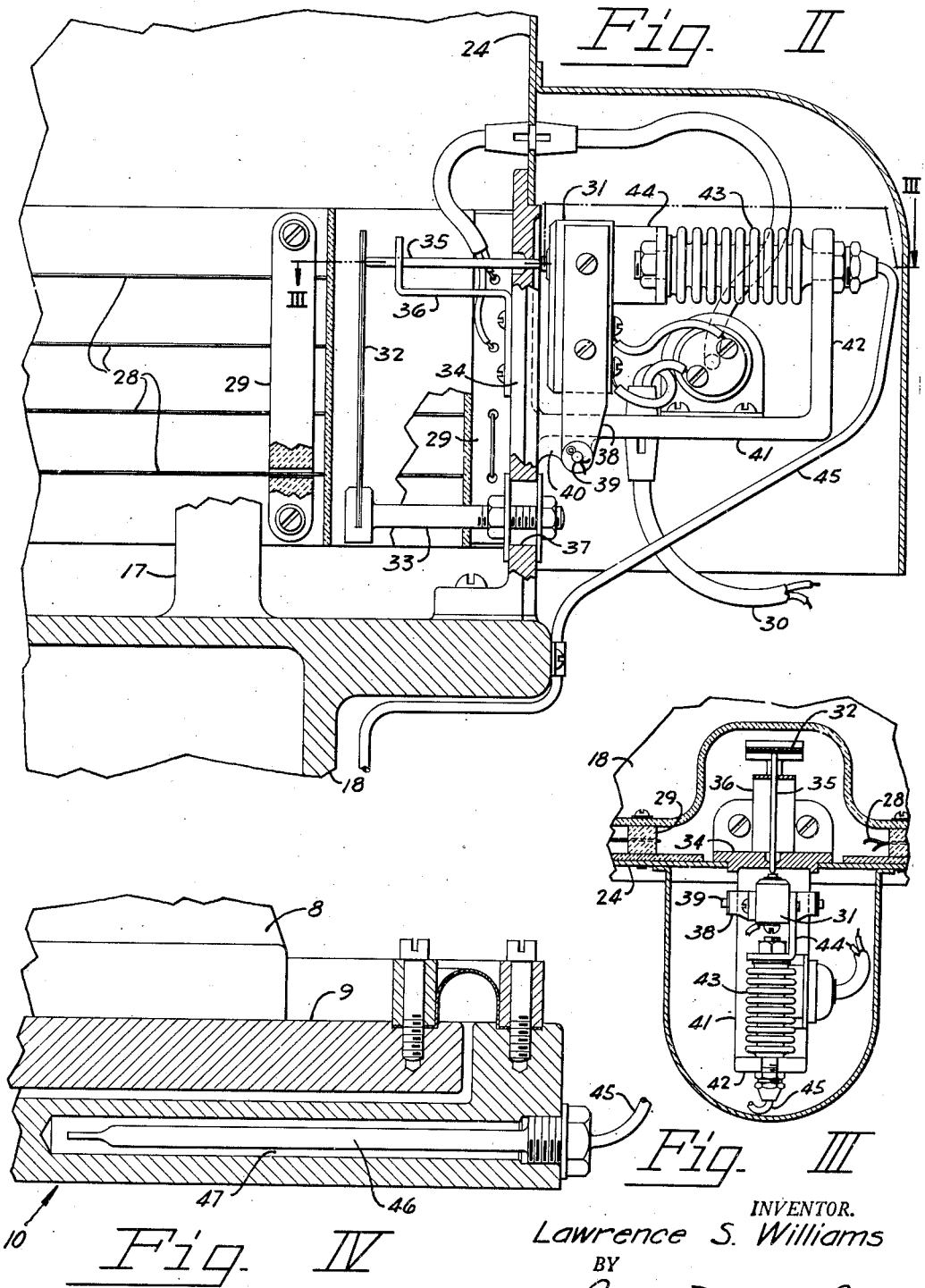
INVENTOR.
Lawrence S. Williams
BY
Marshall & Marshall
ATTORNEYS

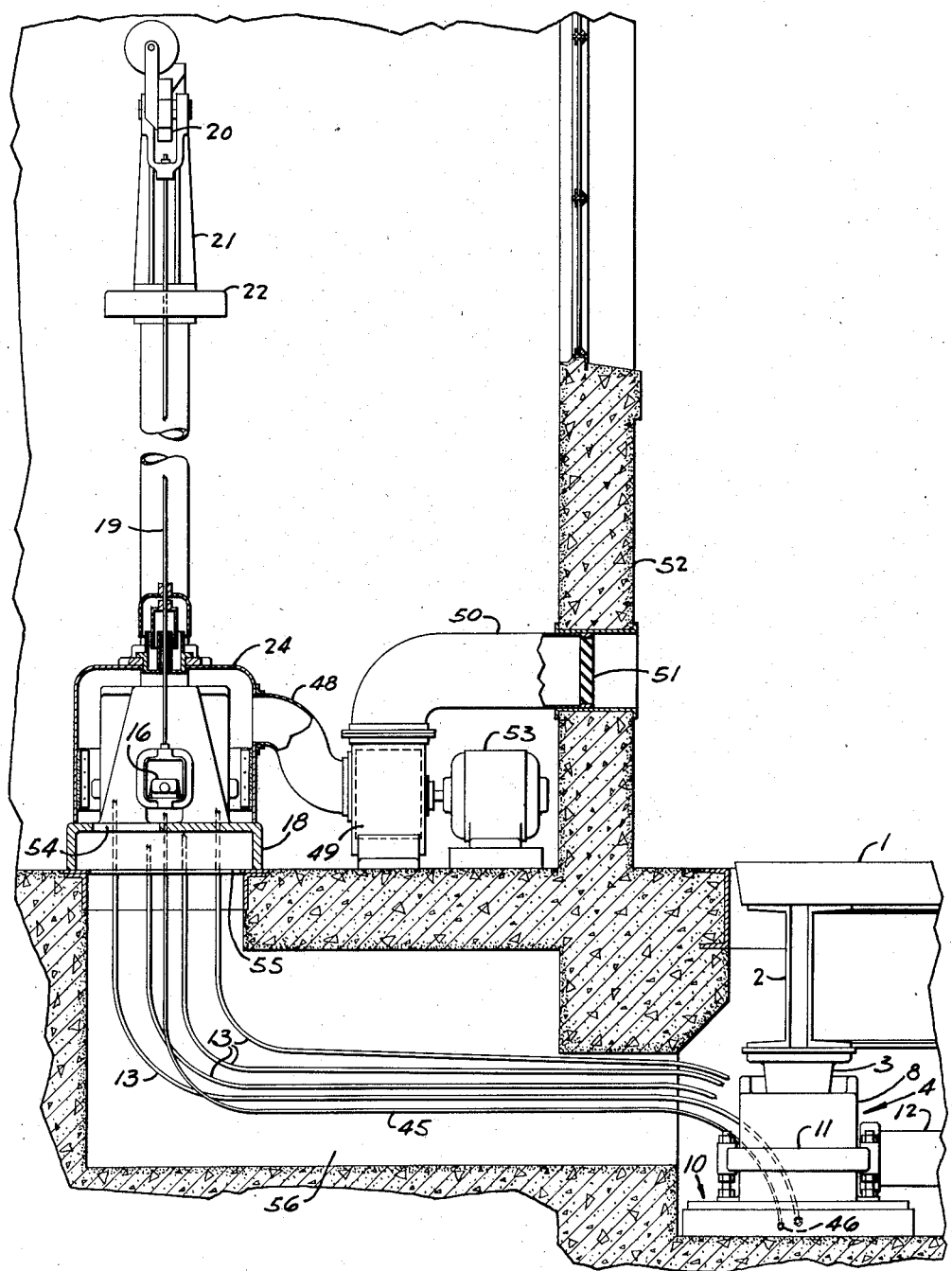
Fig. V

Patented Sept. 13, 1949

2,482,047

UNITED STATES PATENT OFFICE 2,482,047

TEMPERATURE CONTROL FOR WEIGHING SCALES

Lawrence S. Williams, Toledo, Ohio, assignor to Toledo Scale Company, Toledo, Ohio, a corporation of New Jersey Application October 31, 1944, Serial No. 561,193

7 Claims. (Cl. 265—27)

This invention relates to weighing scales and in particular to a temperature control adapted to minimize errors due to the thermal expansion of active parts of the weighing scale.

In ordinary weighing scales temperature effects are relatively unimportant because each of the levers is ordinarily confined to one temperature zone. For example, in an ordinary truck scale the main lever system is installed in a pit beneath the platform with one of the levers extending through a side tunnel into a space beneath the floor of the weigh house. The counterbalancing and indicating mechanism is installed in the weigh house and is connected to the lever system by means of a steelyard rod extending down through the floor. The lever system in the pit assumes the temperature of the pit. Therefore, no great temperature differential exists along the length of any of the levers in the pit and therefore there is no change in their ratios. Likewise, the counterbalancing and indicating mechanism assumes the temperature of the interior of the weigh house whose temperature may or may not be the same as the temperature of the pit. The connection between the two portions of the scale is a steelyard rod having a very limited heat transfer capacity. Inasmuch as there are no levers extending from one temperature zone to another there is no chance for appreciable error due to temperature effects. However, if the force transmission from the scale pit into the weigh house had been by means of a lever instead of a steelyard rod a serious temperature error would be introduced into the scale. This is because the arm of the lever being exposed to one of the temperatures will assume a certain length while the other arm of the same lever being exposed to a different temperature will expand or contract to a different length. Therefore, the ratio of the lever which was adjusted to a given amount with the whole lever at the same temperature will vary according to the temperature difference between the two arms of the lever.

The primary object of this invention is to provide a temperature control for a portion of a weighing scale which will maintain the temperature of that part in agreement with the temperature of other parts of the scale.

Another object of the invention is to provide a temperature control which will maintain a certain temperature relationship between two parts of a scale so that observed temperature errors may be minimized or eliminated.

Another object of the invention is to provide means for maintaining the elements of a scale which are affected by temperature at substantially the same temperature.

These and other objects and advantages are attained in the structure shown in the drawings illustrating a preferred form of the invention.

In the drawings:

Figure I is a front elevation, partly in section, of a hydraulic weighing scale incorporating the invention.

Figure II is an enlarged fragmentary view of the temperature controlling mechanism.

Figure III is a horizontal section of the temperature controlling mechanism taken substantially along the line III—III of Figure II.

Figure IV is a fragmentary sectional view of one of the load supporting capsules incorporating a temperature responsive element.

Figure V is a fragmentary vertical section of a weigh house and adjoining scale pit showing additional means for minimizing temperature errors.

These specific figures and the accompanying description are intended to merely illustrate a preferred embodiment of the invention and are not intended to impose limitations on the claims.

In a hydraulic weighing scale a hydraulic force transmitter is used to transmit force from a load receiver to a load counterbalancing and indicating mechanism. Such a hydraulic force transmitter comprises a hydraulic capsule in load supporting relationship to a load receiver, a pressure responsive bellows acting against a weight counterbalancing mechanism and a hydraulic connection between the two elements. Inasmuch as the hydraulic pressure is constant throughout the system the force transmission ratio is inversely proportional to the effective area of the elements. Any change in the effective area of either the hydraulic capsule or the receiving bellows will appear as an error in the force transmission ratio of the hydraulic force transmitter and introduce a corresponding error into the scale. Unlike the ordinary lever scale in which each lever is generally confined to one temperature zone the hydraulic force transmitter of a hydraulic scale often has its ends located in zones of different temperatures. The capsules are located in the pit beneath the weighing platform and are in general subject to seasonal variations in temperature. The bellows on the other hand are located in a weigh house whose temperature is artificially maintained within comfortable limits. Thus the capsules are exposed to much wider variations in temperature than the corresponding bellows and the hydraulic scale exhibits a pronounced temperature error. According to the invention this error is minimized by providing a small enclosure, which may be thermally insulated, for the bellows ends of the hydraulic force transmitters and maintaining the temperature of the enclosure at a fixed temperature differential with respect to the capsules. The temperature of the enclosure is controlled by a thermostat whose setting is under the control of a long distance thermometer measuring the temperature of the capsules.

Some types of hydraulic force transmitters exhibit a temperature error even though the elements of the transmitter are maintained at the same or corresponding temperatures. This results if the coefficients of thermal expansion of the capsule and of the bellows are not equal. Even this condition may be compensated by the temperature control. This is done by causing the temperature control to maintain a temperature differential between the capsule and the bellows which varies according to the actual temperature of either the capsule or the bellows.

A weighing scale equipped with temperature control is illustrated in the drawings. This scale includes a load receiving platform 1 laid on girders 2 which at their ends, are supported by depending brackets 3 each constituting one part of a single link suspension 4. The suspension 4 includes a link 5 whose ends engage upper and lower crossbars 6 and 7. The lower crossbar 7 is fitted into the bracket 3 while the upper crossbar 6 is carried in a frame 8 supported on a diaphragm 9 of a hydraulic capsule 10. The use of the single link suspensions at each corner of the platform permit horizontal oscillation of the platform without transmitting substantial horizontal or tipping force to the hydraulic capsules 10. Because the diaphragms 9 of the capsules in effect float on hydraulic fluid enclosed within the capsules and the point of load application is comparatively high, they must be prevented from tipping sideways. Such tipping is prevented by metallic loops 11 surrounding the frames 8 and bolted to the diaphragms 9. The loops 11 are connected together by an H-shaped framework 12.

Hydraulic pressure created in the capsules 10 by the weight of the platform 1 and the load carried thereon is transmitted through tubes 13 to a bellows housing 14 containing a plurality of pressure responsive bellows, one for each of the capsules 10. The bellows translate the hydraulic pressure into mechanical force which is transmitted through struts 15 to a gathering lever 16 which is fulcrumed on a pedestal 17 erected from a base 18. The gathering lever 16 is pivotally connected through a steelyard 19 to a weigh beam 20 which is fulcrumed on a stand 21 erected from a weigh beam shelf 22. A poise 23 mounted on the weigh beam 20 is adapted to counterbalance and indicate the force from the load transmitted through the hydraulic system. The bellows housing 14 and the gathering lever 16 are enclosed within a small housing or enclosure 24. The enclosure may be thermally insulated if desired.

In many applications of scales the capsules 10 and the bellows housings 14 are exposed to the same general temperature, but owing to the differences in mass the bellows respond to temperature changes much more quickly than do the capsules. To take care of these conditions it is satisfactory to merely enclose the bellows and gathering lever in a thermally insulated housing and maintain the temperature in the housing somewhat higher than the temperature of the capsules. By maintaining the temperature somewhat higher there will always be some demand for heat and thus complete control can be maintained by regulating the heat input above or below the average requirement. In this case it is desirable that the housing 24 have some heat loss but that the circulation of air through it be minimized. For this purpose an oil seal 25 comprising a cylindrical seal 26 dipping into an annular oil chamber 27 is provided.

The interior of the housing 24 is heated by a resistance wire element 28 supported on ceramic insulators 29 secured to the side walls of the housing 24. Electric power for the resistance wire heater is supplied through an electric cord 30 and is controlled by a sensitive snap switch 31. The snap switch 31 is actuated by a bimetallic strip 32. The strip is mounted on a stud 33 extending horizontally from an upright bracket 34 secured to the base 18. The bimetallic strip 32 acts through a push rod 35 which is guided by an arm 36 to actuate the switch 31. Because the bimetallic strip 32 bends as a cantilever, temperature and sensitivity adjustments may be made by adjusting the position of the stud 33 in an enlarged hole 37 of the bracket 34.

The switch 31 is carried on an arm 38 which is pivotally mounted on a pin 39 carried in a lug 40 extending downwardly from the bottom of a horizontal shelf 41 forming part of the bracket 34. The outer end of the shelf has an upwardly directed portion 42 which supports one end of a bellows 43. The other end of the bellows 43 is attached to an L-shaped finger 44 which is attached to the switch 31. Thus, expansion or contraction of the bellows 43 changes the position of the switch 31 with respect to the bimetallic strip 32, having the effect of changing the temperature setting of the thermostat. The bellows 43 is the receiving end of a long distance thermometer whose capillary tube 45 extends from the bellows 43 to a temperature responsive bulb 46 enclosed in a thermometer well 47 in the base of one of the capsules 10. The space between the bulb 46 and the walls of the well 47 is preferably packed with a thermally conductive material to ensure heat flow to the bulb. Because the bimetallic strip 32 has substantially linear deflection with respect to temperature, the long distance thermometer should preferably be filled with mercury or some other liquid which does not vaporize within the range of temperatures to which the capsule is exposed.

The mechanism is assembled so that an increase in temperature causes the bimetallic strip 32 to bend away from the switch 31 and the long distance thermometer to expand the bellows 43 to cause the switch 31 to follow the bimetallic strip 32. If the bimetallic strip and the long distance thermometer are proportioned to have the same travel per degree change in temperature the thermostat will maintain the temperature within the enclosure a fixed amount greater than the temperature of the capsules. This is satisfactory as long as the capsules and the receiving bellows have substantially the same temperature coefficient of expansion.

If the temperature coefficients of the bellows and the capsules are different, a temperature error would be present in the scale even though the capsule and the bellows were maintained at the same temperature or at a constant temperature differential. The illustrated temperature control can correct for this condition by increasing or decreasing the effectiveness of the bimetallic strip 32. If the strip mounting be moved upwardly so that the length of the bimetallic strip between the stud 33 and the push rod 35 is decreased, the effect of the bimetallic strip is decreased thereby requiring a greater temperature change in the enclosure 24 to compensate a given change in temperature of the capsules. Similarly, if the stud 33 be moved downwardly so as to increase the effective length of the bimetallic strip 32, the controlled temperature within the enclosure 24 will not vary as much as the temperature of the capsules. It is thus possible to secure an adjustment in which the change in temperature of the capsule multiplied by the temperature coefficient of the capsule equals the change in temperature of the bellows multiplied by its temperature coefficient and thus the temperature error of the scale is minimized or completely eliminated.

Merely heating the bellows enclosure will suffice for those applications in which the capsules and the bellows are exposed to substantially the same temperatures. If the same type of control were to be employed in a scale installation in which the platform and capsules were in an outdoor exposed location and subject to a full range of seasonal variations of temperature while the bellows and the counterbalancing and indicating portion of the scale are located within a sheltered, artificially heated weigh house, an unreasonable temperature differential between the bellows housing and the capsules would be required to accommodate all possible temperature differentials. Thus to secure control during the winter season when the capsule temperature may be in the order of 10° F. and the weigh house would be of the order of 70° F. a temperature differential of at least 60° F. would be required. (To secure control the bellows enclosure temperature must be above the ambient temperature.) If this same temperature differential would be employed during the summer season when the capsule temperature may be in the order of 100° F. the bellows would be heated to at least 160° F. For various reasons such a temperature is considered excessive. It is therefore advantageous to provide a fixed amount of cooling and add only as much heat as is required to maintain control. To accomplish this, a suction blower may be installed in the weigh house and adapted to draw air from the bellows enclosure and exhaust it outdoors. In exhausting the air from the bellows enclosure, air is drawn from the pit surrounding the capsules through an interconnecting duct and into the enclosure. The in-coming air, having approximately the same temperature as the capsules, tends to bring the temperature of the bellows to substantially the capsule tempreature.

An arrangement for accomplishing this is illustrated in Figure V. As shown in this figure the bellows enclosing housing 24 is connected through a duct 48 to an air blower 49 which drives the air from the housing outward through a duct 50 and a grill 51 installed in a wall 52 of a weigh house. The blower 49 is advantageously driven by an electric motor 53. The base 18 which supports the bellows housing 24 and force counterbalancing and indicating means is provided with an opening 54 which communicates through a hole 55 in the floor of the weigh house with a tunnel 56 leading to the scale pit. By adjusting the speed of the blower or by inserting dampers in the ducts 48 or 50 the amount of air drawn from the scale pit through the housing may be controlled. Inasmuch as the air drawn from the scale pit, whose temperature varies with the seasons, brings the temperature of the interior of the housing 24 to substantially the same value, only a moderate temperature differential is required to maintain control by heating only. Operated in this way a substantial temperature correction is obtained even though the thermostat should fail.

The temperature control of this type very materially increases the accuracy of any type of weighing equipment in which the parts of the weighing system are distributed throughout zones of different temperature. While its most outstanding field of usefulness is in connection with hydraulic scales or hydraulic force transmission equipment, it is also useful in connection with scales employing the so-called "plate fulcra." A "plate fulcrum," when used, acts as a spring and thus contributes to the weighing of a load. If the temperature varies, its effects also varies and the overall result is an error in indication. By suitably controlling the temperature of another spring in the counterbalancing system of the scale, compensation of this error may be effected.

In some installations it is also possible to eliminate the blower by leading the outlet duct from the enclosure 24 vertically upward and exhausting it above the weigh house roof. The temperature differential existing between the air in the tunnel 56 and the air in the duct leading up through the weigh house is sufficient to maintain adequate circulation. This system of temperature control thus provides a simple inexpensive method of securing increased accuracy in various types of weighing equipment.

Having described the invention, I claim:

1. In a weighing scale having portions of the weighing mechanism located in zones of different temperatures, in combination, a thermometer bulb in contact with the portion of said weighing mechanism located in one temperature zone, a thermally insulated housing enclosing a portion of said mechanism located in a second temperature zone, a thermostat and a heating element controlled thereby located in said insulated housing and means whereby said thermometer bulb affects the setting of said thermostat.

2. In a weighing scale having portions of the weighing mechanism located in zones of different temperatures, in combination, a thermometer bulb responsive to the temperature of the weighing mechanism located in one of said temperature zones, a housing enclosing portions of said mechanism that are located in another temperature zone, a heating element within said housing, a thermostat controlling said heating element and a member responsive to said thermometer bulb for adjusting said thermostat.

3. In a weighing scale having portions of the weighing mechanism located in zones of different temperatures, in combination, a long distance thermometer comprising a bulb and an expansible unit, said bulb being located so as to be responsive to the temperature of the portion of said weighing mechanism located in one temperature zone, a housing enclosing a portion of the weighing mechanism located in another temperature zone, a heating element in said housing, a thermostat controlling said heating element, said expansible unit being connected to said thermostat to vary its adjustment according to the temperature of said bulb.

4. In a weighing scale having temperature sensitive elements located in zones of different temperatures, in combination, a long distance thermometer comprising a temperature sensitive bulb and an expansible unit, said bulb being responsive to the temperature of the elements in a first temperature zone, a housing enclosing the temperature sensitive elements located in another temperature zone, means for heating said housing, a thermostat for controlling said heating means, said thermostat being adjusted by said expansible member to maintain a substantially constant temperature differential between said housing and the elements in said first temperature zone.

5. In a weighing scale having parts of its weighing mechanism installed in regions of different temperatures, in combination, an enclosure for one portion of said mechanism, a heater for maintaining the temperature of said enclosure, and thermostatic means having a first element in the enclosure and a second element adjacent the remainder of said mechanism for controlling said heater.

6. In a weighing scale having parts of its weighing mechanism installed in regions of different temperatures, in combination, an enclosure for the part of said mechanism installed in a first temperature region, a heater for supplying heat to said enclosure, a thermostat for said heater, a long distance thermometer responsive to the temperature of a second region containing a cooperating part of the weighing mechanism for adjusting the temperature setting of said thermostat, and means for circulating air from said second region through said enclosure to reduce the temperature differential between the enclosure and the second region.

7. In a weighing scale in which parts of its weighing mechanism have different temperature coefficients, in combination, an enclosure for one part of said mechanism, a heater for supplying heat to said enclosure, a thermostat for said heater, temperature responsive mechanism for adjusting the setting of said thermostat in accordance with the temperature of another part of said mechanism at a rate different than the sensitivity of the thermostat whereby the temperature difference between the parts of said mechanism is dependent upon the temperature of one of the parts of said mechanism.

LAWRENCE S. WILLIAMS.

REFERENCES CITED

The following references are of record in the file of this patent:

UNITED STATES PATENTS

| Number | Name | Date |
| --- | --- | --- |
| 2,152,556 | Messinger | Mar. 28, 1939 |
| 2,180,176 | Stone | Nov. 14, 1939 |
| 2,299,867 | Wolfson | Oct. 27, 1942 |
| 2,334,242 | Bohannan | Nov. 16, 1943 |

FOREIGN PATENTS

| Number | Country | Date |
| --- | --- | --- |
| 93,514 | Austria | Jan. 15, 1923 |